United States Patent
Aumiller et al.

[19]

[11] Patent Number: 5,910,077
[45] Date of Patent: Jun. 8, 1999

[54] DOOR ACTUATED EXTENDABLE STRAP HANDLE

[75] Inventors: Curtis D. Aumiller, Holland; Rick A. Anderson, Grand Haven, both of Mich.

[73] Assignee: Prince Corporation, Holland, Mich.

[21] Appl. No.: 08/727,031

[22] Filed: Oct. 8, 1996

[51] Int. Cl.⁶ ................................. E05F 7/08; E05B 1/00
[52] U.S. Cl. ........................ 49/460; 16/115; 296/146.1; 296/152; 49/461
[58] Field of Search ...................... 49/460, 461; 16/115; 296/146.1, 152, 153

[56] References Cited

U.S. PATENT DOCUMENTS

| | | | |
|---|---|---|---|
| D. 123,446 | 11/1940 | Worthington | 16/115 |
| 670,492 | 3/1901 | Gould | 16/115 |
| 2,111,059 | 3/1938 | Basel | 49/460 X |
| 2,224,371 | 12/1940 | Witchger | 296/146.4 |
| 2,274,892 | 3/1942 | Fox | 49/262 |
| 2,610,084 | 9/1952 | Anderson | 49/460 |
| 2,677,573 | 5/1954 | Anderson | 49/460 |
| 3,243,222 | 3/1966 | Loughary et al. | 49/460 |
| 4,021,072 | 5/1977 | Belanger | 296/152 X |
| 4,949,508 | 8/1990 | Elton | 296/152 X |
| 5,137,294 | 8/1992 | Martin | 296/152 X |
| 5,504,974 | 4/1996 | Graber | 49/460 |
| 5,509,689 | 4/1996 | Lin | 16/115 X |

FOREIGN PATENT DOCUMENTS

| | | |
|---|---|---|
| 3279034 | 12/1991 | Japan. |
| 3279035 | 12/1991 | Japan. |
| 3279036 | 12/1991 | Japan. |
| 3279037 | 12/1991 | Japan. |
| 687329 | 3/1994 | Japan ...................... 296/152 |

*Primary Examiner*—Daniel P. Stodola
*Assistant Examiner*—Gregory J. Strimbu
*Attorney, Agent, or Firm*—Price, Heneveld, Cooper, DeWitt & Litton

[57] ABSTRACT

An extendable door handle has a first end mounted in a stationary position to a vehicle door and a second end movably coupled to the door. A control member extends between the second end of the extendable strap handle and a door mounting mechanism for moving the second end of the door handle toward the first end when the door is opened, thereby extending the extendable strap door handle outwardly away from the door in a curved fashion making the handle more accessible for closing the door.

18 Claims, 4 Drawing Sheets

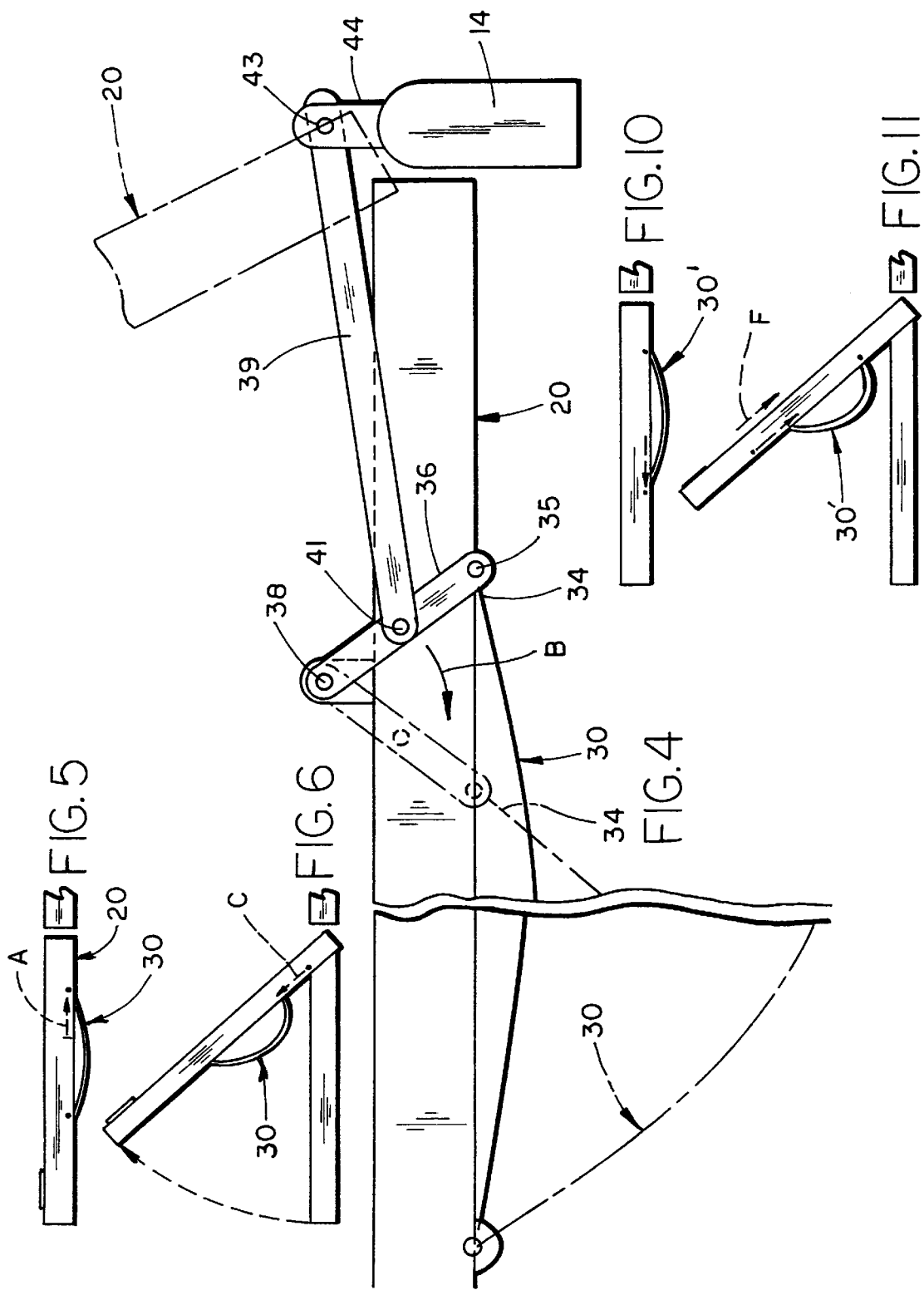

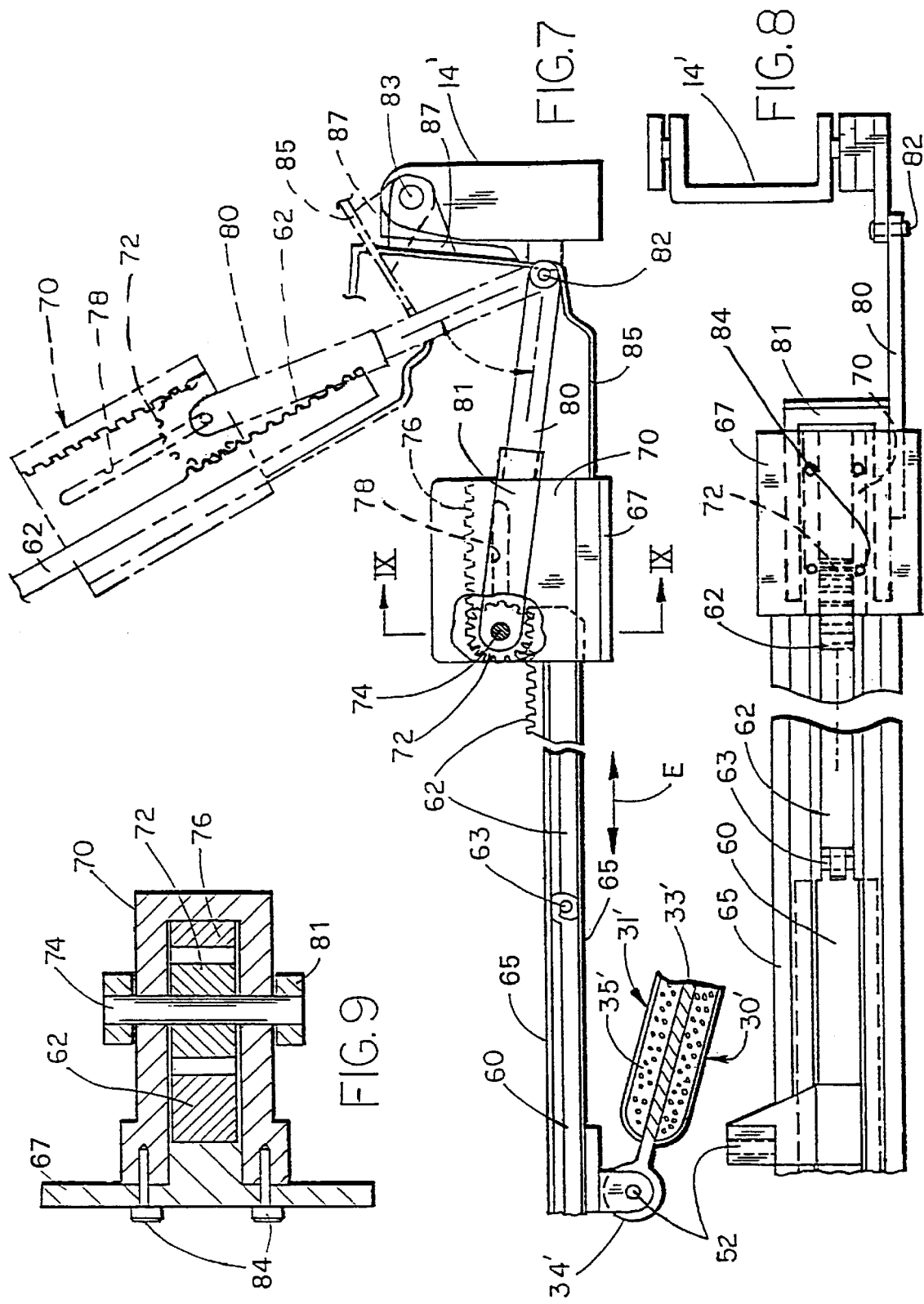

DOOR ACTUATED EXTENDABLE STRAP HANDLE

BACKGROUND OF THE INVENTION

The present invention relates to an interior vehicle door handle and one which can be extended for easy access when the door is opened.

With larger vehicles and particularly those with two doors, once a passenger has been seated with the door in a fully opened position, it is sometimes difficult, particularly with shorter people, to reach the opened door to close it prior to moving the vehicle. One solution was proposed in U.S. Pat. Nos. 2,610,084 and 2,677,573, in which a pivoted handle is mounted to the inside of the door and can be extended to provide a readily accessible closure handle. Such construction, however, does not conform to modern vehicle design in which typically strap-like door handles are employed or handles integrally formed with an armrest. Accordingly, there is a need for a door handle which can facilitate closure of particularly large doors in larger vehicles when the door is in a fully opened position and the passenger or driver is seated.

SUMMARY OF THE PRESENT INVENTION

The structure of the present invention solves this problem by providing a strap-like door handle in which one end is mounted to a vehicle door in a stationary position and an opposite end is coupled to the door in movable relationship. A control member extends between the movable end of the strap-like door handle to the door mounting mechanism for moving the movable end of the strap toward the first end when the door is opened, thereby extending the strap outwardly in a curved fashion making it reachable for closing the door. As the door is closed, the control mechanism moves the movable end away from the first end such that the strap is generally flush with the interior of the door. The control mechanism may include a linkage assembly coupled between the door mounting post and the end of the door handle or, in an alternative embodiment, a rack and pinion type control mechanism for selectively moving the movable end of the strap with respect to the opposite end as the door is opened and closed. With such a system, therefore, the vehicle occupant is provided with an extensible door handle which facilitates closure of the door when the operator or passenger is seated and the door is fully opened and yet provides a door handle which conforms to modern vehicle interior design.

These and other features, objects and advantages of the present invention will become apparent upon reading the following description thereof together with reference to the accompanying drawings.

BRIEF DESCRIPTION OF THE DRAWINGS

FIG. 4 is a top plan pictorial view of the control mechanism shown in FIG. 3 shown in phantom form;

FIG. 5 is a top plan pictorial illustration of the movement of the door handle shown in FIGS. 1–4 as the door is closed;

FIG. 6 is a top plan pictorial view illustrating the movement of the door handle shown in FIGS. 1–4 as the door is opened;

FIG. 7 is a partial cross-sectional view of an alternative control mechanism for the extendable door handle of the present invention;

FIG. 8 is a front elevational view of the structure shown in FIG. 7;

FIG. 9 is a cross-sectional view of a portion of the control mechanism taken along section lines IX—IX of FIG. 7;

FIG. 10 is a top plan pictorial view illustrating the motion of the extendable door handle shown in FIGS. 7–9 as the door is moved to a closed position; and FIG. 11 is a top plan pictorial view illustrating the motion of the extendable door handle shown in FIGS. 7–9 as the door is moved to an open position.

DETAILED DESCRIPTION OF THE PREFERRED EMBODIMENTS

Figure 1:
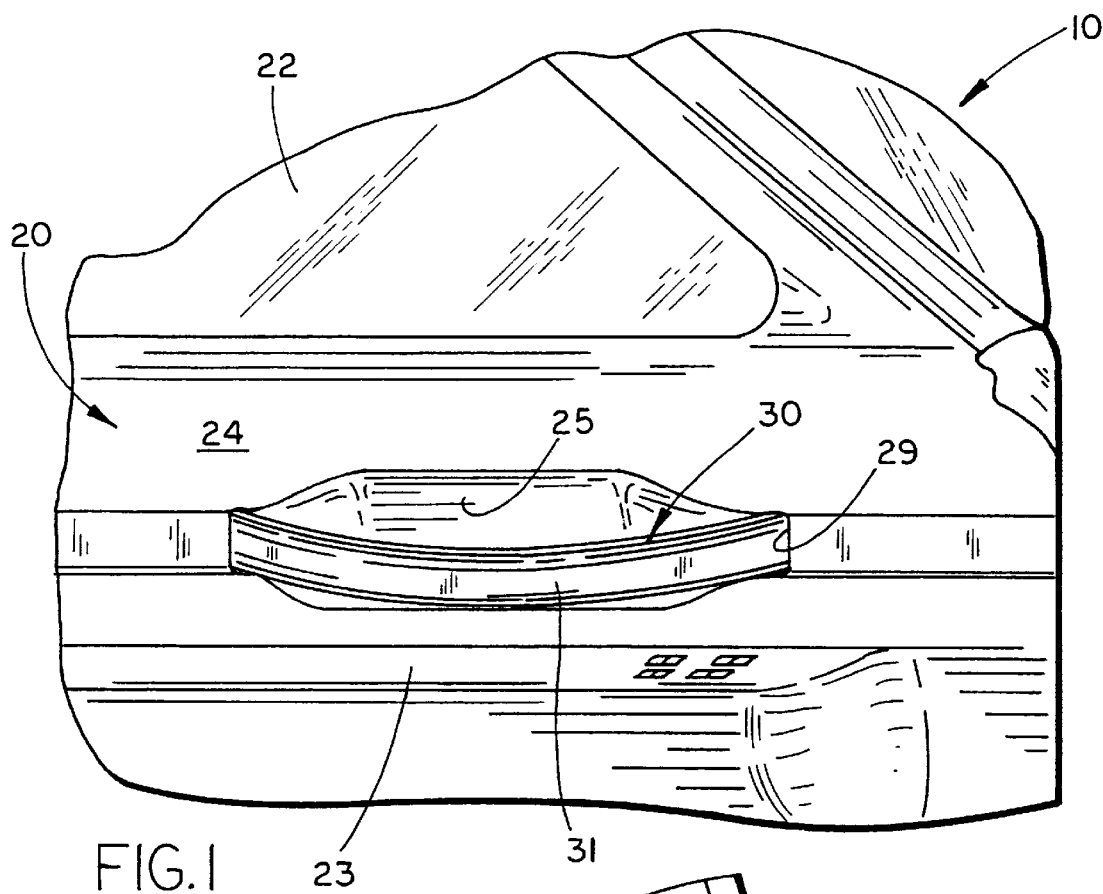
FIG. 1 is a fragmentary perspective view of a vehicle door including an extendable handle according to the present invention, shown with the door in a closed position.
Figure 2:
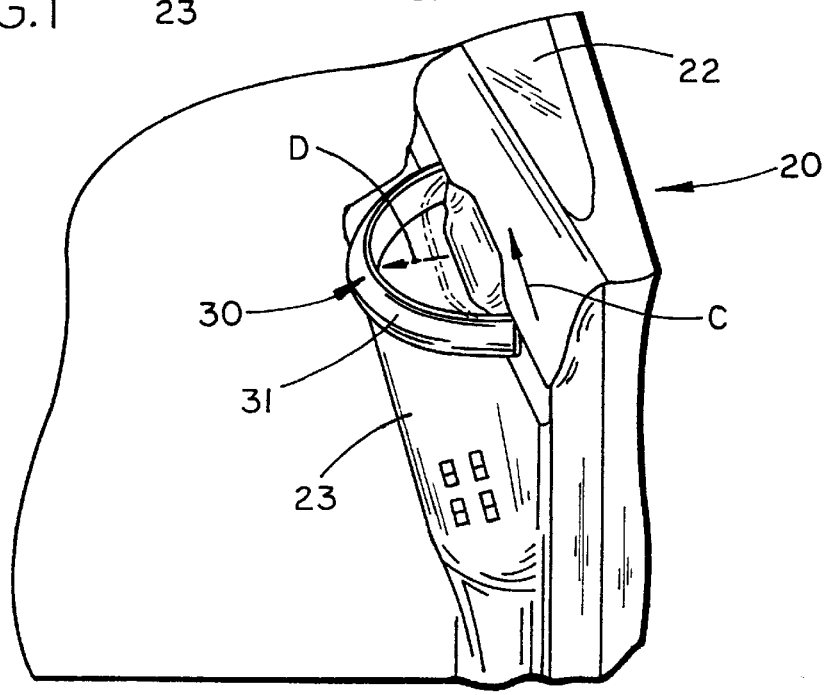
FIG. 2 is a fragmentary perspective view of the door handle shown in FIG. 1, shown with the door in an opened position.
Figure 3:
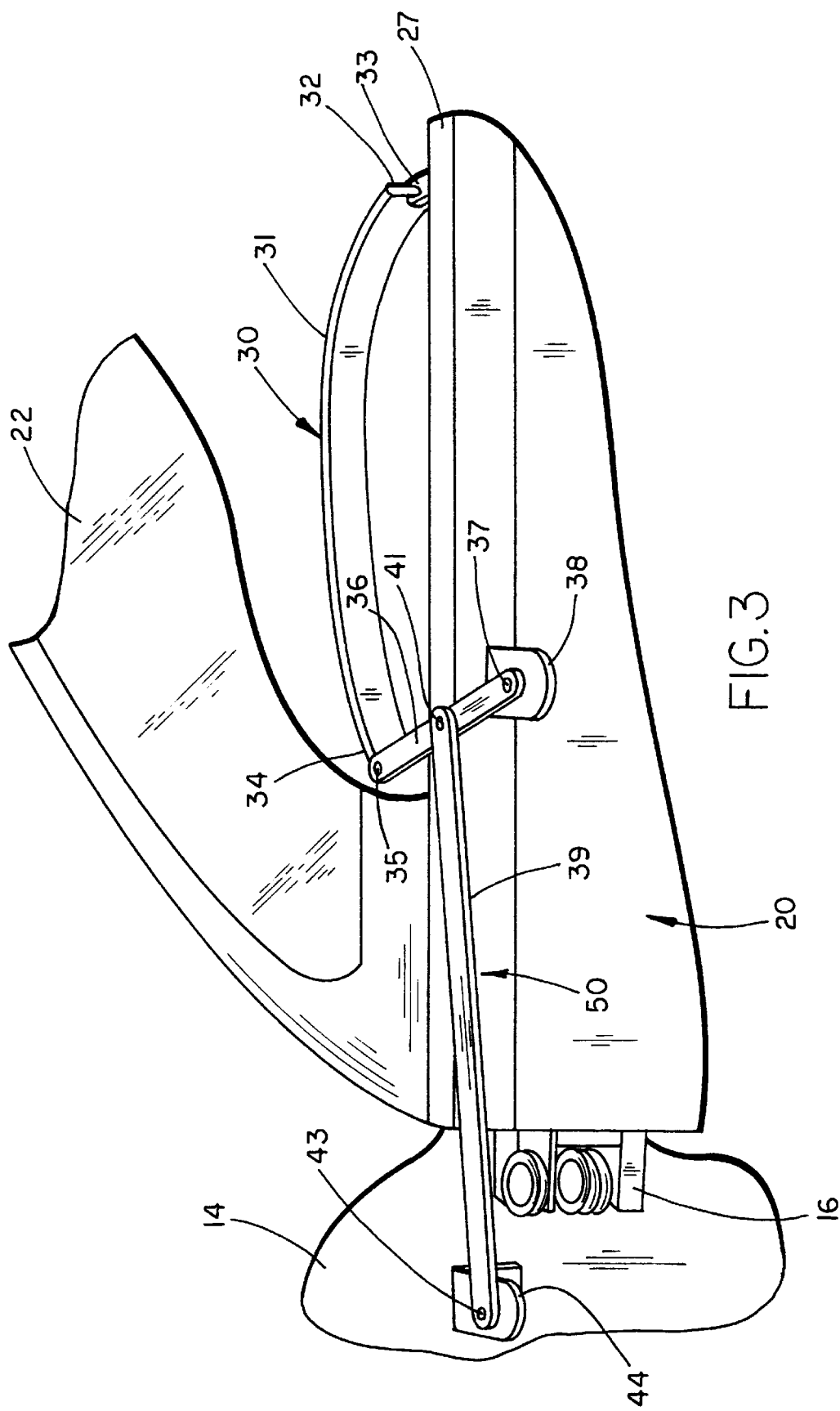
FIG. 3 is a fragmentary pictorial view, partly broken away, of the control mechanism for mounting a door handle according to the present invention to the vehicle door shown in FIGS. 1 and 2.

Referring initially to FIGS. 1 and 2, there is shown a vehicle 10, such as an automobile, for which there is shown a driver's side door 20 having a side window 22 and an armrest 23. Door 20 is pivotally mounted to the vertical door jamb 14 in the A-pillar area of the vehicle which is shown schematically in FIG. 3. Vertical door jamb 14 comprises the channel sheet metal structure to which the door 20 is mounted by means of one or more conventional hinge assemblies 16 (FIG. 3). The door 20 further includes a decorative inner panel 24 which can be molded of a composite material and integrally includes a decorative outer surface. Panel 24 includes a recess 25 for the door handle assembly 30 of the present invention. Recess 25 includes at its forward end a suitable slot 29 to allow a movable end 34 (FIG. 3) of strap 31 to move in and out of the panel 24 to extend as seen in FIG. 2 and retract as shown in FIG. 1 as described below.

The door handle assembly 30 comprises a flexible strap 31 which typically will include a flat resilient metal reenforcing member surrounded by a covered polymeric cushioning material and is of a fixed length having a first end 32 (FIG. 3) pivotally anchored to a door sill 27 by means of a pivot mount 33, which can be of conventional construction. Thus, although end 32 can pivot, it is anchored at a fixed location on the door 20. Pivot mount 33 can be of conventional construction and include, for example, a flange with an aperture for receiving a clevis mounted to the first end 32 of strap 31 or other suitable construction which anchors the end 32 of the strap 31 with respect to the door 20 but allows it to pivot as it is extended. In some embodiments, this pivot mount may not be necessary due to the flexibility of the strap which will allow this end of strap 31 to move sufficiently.

The second or movable end 34 of strap 31 is pivotally mounted by a pivot mount mechanism 35 to the end of a pivoted link 36 which has an end opposite pivot mount 35 pivotally mounted to door sill 27 by means of a pivot pin 37 and a mounting flange 38. A control arm 39 is pivotally coupled by pivot pin 41 to the link 36 intermediate its opposite ends and has an opposite end coupled to the door jamb 14 of the vehicle by means of a pivot pin 43 mounted to an L-shaped bracket 44.

The operation of the hand control assembly 50 collectively including linkage 36 and control arm 39 is best seen by reference to the schematic drawing of FIG. 4 where the door closed position is shown in solid lines and the door open position is shown in phantom lines. With the door closed, pivot mount 35 of link 36 is closer to the fixed door jamb 14 and, therefore, movable end 34 of the strap 31 is moved in a direction indicated by arrow A in FIG. 5 to flatten the flexible strap 31 close to the door in recess 25. When, however, the door is pivoted to an open position, as shown in phantom form in FIG. 4, link 36 pivots in the direction indicated by arrow B in FIG. 4, thereby moving end 34 of strap 31 in a direction indicated by arrow C in FIGS. 2 and 6 to extend strap 31 outwardly for easier access with the door in an open position. This outward movement of the strap is also illustrated by arrow D in FIG. 2. Thus, in the embodiment shown in FIGS. 1–6, the forward movable end of strap 31 moves toward and away from the fixed door jamb 14 to extend and retract the door handle so formed for easy access. In an alternative embodiment of the invention shown in FIGS. 7–11, the far end of the strap moves toward and away from the door jamb 14 utilizing a different mechanism, however, to accomplish the same objective.

In the embodiment shown in FIGS. 7–11, the first end 34' of the door handle assembly 30' is pivotally mounted by pivot pin 52 to a slide 60 having a rack 62 mounted thereto by an interconnecting pin 63. Rack 62 is supported in a guide block 70 by a support plate 67 (support plate 67 is secured to guide block 70 with bolts 84) for movement of slide 60 and rack 62 toward and away from the door jamb 14 in directions indicated by arrow E in FIG. 7. The second end (not shown) of door handle assembly 30' is pivotally fixed to door 85 in a conventional fashion. The generally U-shaped guide block 70 includes a pinion gear 72 rotatably mounted thereto by means of a pivot pin 74 and includes an opposed facing rack 76. The pivot pin 74 is mounted within a slide 78 formed in the upper and lower walls of the U-shaped guide 70 and is secured to clevis 81 that is coupled to a pivoted arm 80 having its end remote from pinion gear 72 pivotally coupled to the door jamb 14' by means of a pivot pin 82. As the door is moved from a closed position shown in solid lines in FIG. 7 to an open position shown in phantom form, the door rotates about a pivot 83 of door jamb 14' and pinion gear 72 rotates in a counterclockwise direction, as shown in the top view of FIG. 7, thus drawing the slide 60 toward the door jamb 14' and moving the first end 34' of strap 31' toward the door jamb, extending the handle as illustrated in the pictorial view of FIG. 11. Thus, end 34' of door handle assembly 30' moves in the direction indicated by arrow F in FIG. 11 when the door is opened to extend door handle assembly 30' for easy access with the door open. When the door is subsequently closed, the opposite motion occurs to again retract the handle. The door sill 27 (FIG. 3) includes suitable auxiliary fixed guides 65 for slidably guiding slide 60 in this alternative embodiment.

Thus, in both embodiments of the invention, a flexible strap-like handle having a flexible band 33' (FIG. 7) surrounded by cushioning material 35' has one end pivotally but otherwise fixedly secured to the vehicle door and an opposite end slidable toward and away from the fixed end to extend and retract, respectively, the door handle for easier access. In one embodiment, the end of the handle proximate the door jamb is moved by a control assembly comprising a linkage assembly and in an alternative embodiment the distal end of the handle is moved toward and away from the door jamb utilizing a slide control in which a rack and pinion mechanism is employed.

It will become apparent to those skilled in the art that other control mechanisms coupled between the door, the door jamb and the handle can be employed for flexing the handle to extend it for easier access when the door is in an opened position. Various modifications to the preferred embodiments of the invention will become apparent to those skilled in art but will fall within the spirit or scope of the invention as defined by the appended claims.

The embodiments of the invention in which an exclusive property or privilege is claimed are defined as follows:

1. A door for a vehicle, having a door jamb, said door being adapted to be connected with the door jamb and being movable between a closed position and an open position, the door comprising:

a flexible strap having one end movably mounted to the door for movement of said strap between a retracted position adjacent the door and an extended position extended away from the door; and a control mechanism coupled to said strap and responsive to movement of the door between the closed position and the open position for moving said strap, between the retracted position and the extended position said control mechanism moving said one end of said flexible strap towards an opposite end of the flexible strap when moving said door from said closed position to said open position.

2. The door as defined in claim 1 wherein said opposite end is pivotally mounted to the door.

3. The door as defined in claim 2 wherein said control mechanism comprises a linkage assembly coupled to the door and adapted to be coupled to the door jamb said linkage assembly having a movable first link coupled to said one end of said strap for moving said one end of said strap toward said opposite end of said strap when said door is moved from said closed position to said open position.

4. The door as defined in claim 3 wherein said first link having one end mounted to said one end of said strap and an opposite end including means for pivotally coupling said opposite end of said first link to the door, and said linkage assembly including a second link having one end pivotally coupled to said first link at a position between said one end of said first link and said opposite end of said first link, said second link having an opposite end including means for pivotally coupling said opposite end of said second link to the door jamb.

5. The door as defined in claim 1 wherein said control mechanism comprises a slide coupled to said one end of said strap and a control member coupled between the door and the door jamb for moving said slide when the door is moved from the closed position to the open position to move said one end of said strap toward said opposite end of said strap.

6. The door as defined in claim 1 wherein said flexible strap includes a center reinforcing member and an exterior padded member.

7. A door for a vehicle, having a door jamb, said door being adapted to be connected to the door jamb and being movable between a closed position and an open position, the door comprising:

a flexible strap having one end movably mounted to the door for movement of said strap between a retracted position adjacent the door and an extended position extended away from the door;

a control mechanism coupled to said strap and responsive to movement the door between the closed position and the open position for moving said strap between the retracted position and the extended position; and wherein said control mechanism comprises a slide coupled to said one end of said strap and a control member coupled between the door and the door jamb for moving said slide when the door is moved from the closed position to the open position to move said one end of said strap toward an opposite end of said strap, and wherein said slide includes a rack mounted thereto and said control member includes a rack and a pinion gear, said pinion gear being mounted to a clevis that is mounted to a pivot arm, wherein said pivot arm is adapted to be coupled to the door jamb such that as the door is moved from the closed to the open position, said pinion gear rotates to move said slide and said one end of said strap toward said opposite end of said strap for moving said strap into the extended position.

8. A vehicle door and handle assembly adapted to be connected to a door jamb, said assembly comprising:

a vehicle door;

a flexible strap having first and second ends, said flexible strap movably mounted to said door between a retracted position adjacent said door and an extended position extending from said door; and a control mechanism coupled to said strap and said door and responsive to movement of said door between a closed position and open position for moving said strap between the retracted and extended positions said control mechanism moving said second end of said strap towards said first end of said strap when is moved toward said open position.

9. The door and handle assembly as defined in claim 8 wherein said strap has said first end mounted to said door at a fixed location and said second end coupled to said control mechanism, said second end being movable toward and away from said first end as said door is moved between said open position and said closed position, respectively.

10. The door and handle assembly as defined in claim 9 wherein said control mechanism comprises a linkage assembly coupled to said door and adapted to be coupled to the door jamb, said linkage assembly having a movable link coupled to said second end of said strap for moving said second end toward said first end when said door is moved toward said open position.

11. The door and handle assembly as defined in claim 9 wherein said control mechanism comprises a slide coupled to said second end of said strap and a control member coupled between said door and the door jamb for moving said slide when said door is moved from said closed position to said open position to move said second end of said strap toward said first end.

12. A vehicle door and handle assembly adapted to be connected to a door jamb, said assembly comprising:

a vehicle door;

a flexible elongated strap movably mounted to said door between a retracted position adjacent said door and an extended position extending from said door;

a control mechanism coupled to said strap and said door and responsive to movement between a closed position and an open position of said door for moving said strap between the retracted and extended position by moving a second end of said strap toward an opposite first end of said strap;

wherein said strap has the first end mounted to said door at a fixed location and the second end coupled to said control mechanism, said second end being movable toward and away from said first end as said door is moved between the closed and open positions;

wherein said control mechanism comprises a slide coupled to said second end of said strap and a control member coupled between said door and the door jamb for moving said slide toward said first end of said strap when said door is moved toward said open position, and wherein said slide includes a rack mounted thereto, and said control member includes a guide for said rack and a pinion gear which rotates to move said second end of said strap toward said first end for moving said strap into said extended position.

13. A door for a vehicle having a door jamb, the door being movable between a closed position and an open position, the door comprising:

a flexible strap having one end pivotally mounted to a fixed location on the door and an opposite end; and a control mechanism coupled to said opposite end of said strap and movable in response to movement of the door between the closed position and the open position for moving said opposite end of said strap toward said one end for extending said strap away from said door for easy access to the strap when the door is in the open position.

14. The door as defined in claim 13 wherein said control mechanism comprises a linkage assembly coupled to the door said linkage assembly having a movable first link coupled to said opposite end of said strap.

15. The door as defined in claim 14 wherein said movable first link has one end mounted to said opposite end of said strap and an opposite end including means for pivotally coupling said opposite end of said first link to the door, and said linkage assembly includes a second link having one end pivotally coupled to said first link at a position between said one end of said first link and said opposite end of said first link, said second link including an opposite end and a means for pivotally coupling said opposite end of said second link to the door jamb.

16. The door as defined in claim 13 wherein said control mechanism comprises a slide coupled to said opposite end of said strap and a control member coupled between the door and the door jamb for moving said slide when the door is moved from the closed position to the open position to move said opposite end of said strap toward said one end.

17. The door handle as defined in claim 13 wherein said flexible strap includes a center reinforcing member and an exterior padded member.

18. A door for a vehicle having a door jamb, the door being movable between a closed position and an open position, the door comprising:

a flexible strap having one end pivotally mounted to a fixed location on the door and an opposite end;

a control mechanism coupled to said opposite end of said strap and movable in response to movement of the door between the closed position and the open position for moving said opposite end of said strap toward said one end for extending said strap away from said door when the door is in the open position, wherein said control mechanism comprises a slide coupled to said opposite end of said strap and a control member coupled between the door and the door jamb for moving said slide toward said one end of said strap when the door is moved toward the open position, and wherein said slide includes a rack mounted thereto and said control member includes a rack and a pinion gear, said pinion gear being mounted to a clevis that is mounted to a pivot arm, wherein said pivot arm is adapted to be coupled to the door jamb such that as the door is moved from the closed to the open position, said pinion gear rotates to move said slide and said opposite end of said strap toward said one end of said strap for extending said strap away from said door.

* * * * *

UNITED STATES PATENT AND TRADEMARK OFFICE
CERTIFICATE OF CORRECTION

PATENT NO.   :   5,910,077
DATED        :   June 8, 1999
INVENTORS    :   Curtis D. Aumiller et al.

Page 1 of 2

It is certified that error appears in the above-identified patent and that said Letters Patent is hereby corrected as shown below:

Column 3, line 27;
   "14" should be --14'--.

Column 4, line 58;
   "opening and closing of the" should be --movement of the--.

Column 5, line 19;
   After "positions" insert --,--.

Column 5, line 21;
   "when is moved" should be --when said door is moved toward said open position--.

Column 5, lines 50 and 51;
   "between a closed position and an open position of said door" should be --of said door between a closed position and an open position--.

Column 5, line 52;
   "position" should be --positions--.

Column 6, line 19;
   After "door" insert --and adapted to be coupled to the door jamb--.

UNITED STATES PATENT AND TRADEMARK OFFICE
CERTIFICATE OF CORRECTION

PATENT NO.  : 5,910,077
DATED       : June 8, 1999
INVENTORS   : Curtis D. Aumiller et al.

It is certified that error appears in the above-identified patent and that said Letters Patent is hereby corrected as shown below:

Column 6, line 36;
    Delete "handle".

Abstract, line 1;
    After "extendable" insert --strap--.

Abstract, line 4;
    After "strap" insert --door--.

Signed and Sealed this

Twenty-sixth Day of October, 1999

*Attest:*

Q. TODD DICKINSON

*Attesting Officer*

*Acting Commissioner of Patents and Trademarks*